(12) United States Patent
Inoue (10) Patent No.: US 10,813,826 B2
(45) Date of Patent: Oct. 27, 2020

(54) AIR SUPPLY AND EXHAUST DEVICE FOR AIR CELLS

(71) Applicant: TOYOTA BOSHOKU KABUSHIKI KAISHA, Aichi-ken (JP)

(72) Inventor: Yuya Inoue, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 179 days.

(21) Appl. No.: 15/977,650

(22) Filed: May 11, 2018

(65) Prior Publication Data

US 2018/0333325 A1   Nov. 22, 2018

(30) Foreign Application Priority Data

May 17, 2017  (JP) .................................. 2017-098137
Apr. 10, 2018  (JP) .................................. 2018-075259

(51) Int. Cl.
*A61H 9/00*  (2006.01)
*B60N 2/90*  (2018.01)

(52) U.S. Cl.
CPC .......... *A61H 9/0078* (2013.01); *B60N 2/976* (2018.02); *A61H 2201/0149* (2013.01); *A61H 2201/1207* (2013.01); *A61H 2201/1623* (2013.01); *A61H 2201/5056* (2013.01)

(58) Field of Classification Search
CPC .......... A61H 9/0078; A61H 2201/0149; A61H 2201/1207; A61H 2201/1623; A61H 2201/5056; B60N 2/976
See application file for complete search history.

(56) References Cited

U.S. PATENT DOCUMENTS

| 2013/0237889 | A1* | 9/2013 | Wright ................. | A61H 9/0078 601/149 |
| 2016/0106620 | A1 | 4/2016 | Uno et al. | |
| 2016/0296413 | A1* | 10/2016 | Norman ............... | A61H 9/0078 |
| 2017/0028163 | A1* | 2/2017 | Onuma ................ | G05D 1/0061 |
| 2019/0053972 | A1* | 2/2019 | Yamaguchi ........... | B60N 2/665 |

FOREIGN PATENT DOCUMENTS

| JP | 2016-77569 | 5/2016 |
| WO | 2013/138307 | 9/2013 |

OTHER PUBLICATIONS

Valve Magaze, Fall 2006, vol. 18, No. 4, pp. 1-8 (Year: 2006).*
Office Action for German Patent Application No. DE102018207419.4 dated May 4, 2020, along with English translation thereof.

* cited by examiner

*Primary Examiner* — Timothy A Stanis
*Assistant Examiner* — Charles M Vivian
(74) *Attorney, Agent, or Firm* — Greenblum & Bernstein, P.L.C.

(57) ABSTRACT

An air supply and exhaust device including: a distributor configured to supply air by supplying air pressure from a pump sequentially to each of a plurality of air cells and exhaust air by supplying atmospheric pressure to the air cell to which air has been supplied; and a control circuit configured to cause the pump and the distributor to operate simultaneously during air supply and exhaust operation to the air cells, and stop the pump from operating and then stop the distributor from operating after a predetermined time has passed when the air supply and exhaust operation to the air cells is stopped, wherein the predetermined time is set to be longer than a time for the distributor to switch from a state of supplying air to one of the air cells to a state of exhausting air from the one of the air cells.

5 Claims, 9 Drawing Sheets

AIR SUPPLY AND EXHAUST DEVICE FOR AIR CELLS

CROSS-REFERENCE TO RELATED APPLICATIONS

This application claims priority from Japanese Patent Application No. 2017-098137 filed on May 17, 2017 and Japanese Patent Application No. 2018-075259 filed on Apr. 10, 2018, the entire contents of which are incorporated herein by reference.

TECHNICAL FIELD

The disclosure relates to an air supply and exhaust device for air cells which is configured to supply and exhaust air to and from the air cells installed in such as a massage apparatus.

BACKGROUND ART

A massage apparatus has been developed for some automobiles, which is configured to, via a distributor, supply and exhaust air sequentially to and from a plurality of air cells installed in a seat, and to massage a body of a seated person (see JP-A-2016-77569). In such a massage apparatus, air pressure in the air cells is set to atmospheric pressure when air supply and exhaust operation to the air cells is stopped, that is, when air pressure is not supplied to the air cells. Accordingly, when the air supply and exhaust operation to the air cells is stopped, the distributor is kept rotating until the air cell reaches a state to be connected to an atmosphere opening. To achieve this, a limit switch for detecting a position is provided in the distributor.

However, since it is necessary to provide the limit switch for detecting a position, the configuration of the device becomes complicated.

SUMMARY

An aspect of the disclosure is to continue operation of the distributor for a time until the air cell reaches a position communicating with the atmospheric pressure when the air supply and exhaust operation to the air cells is stopped. By doing so, the configuration of the device is simplified as the limit switch for detecting positions is not required.

According to an aspect of the disclosure, there is provided an air supply and exhaust device for air cells, which is configured to supply air to a plurality of air cells and exhaust air from the plurality of air cells, the air supply and exhaust device including: a distributor configured to supply air by supplying air pressure from a pump sequentially to each of the plurality of air cells and exhaust air by supplying atmospheric pressure to the air cell to which air has been supplied; and a control circuit configured to cause the pump and the distributor to operate simultaneously during air supply and exhaust operation to the air cells, and stop the pump from operating and then stop the distributor from operating after a predetermined time has passed from the stop of the operating of the pump when the air supply and exhaust operation to the air cells is stopped, wherein the predetermined time is set to be longer than a time for the distributor which is operating to switch from a state of supplying air to one of the air cells to a state of exhausting air from the one of the air cells.

Accordingly, the distributor continues operating for a time until the distributor reaches a position where the atmospheric pressure is supplied air cells when air supply and exhaust operation to the air cells is stopped. Accordingly, the air supply and exhaust operation to the air cells is stopped after the air cells reach a position communicating with the atmospheric pressure. Therefore, a function of keeping the distributor operating until the air cells reach the position communicating with the atmospheric pressure can be realized without a limit switch for detecting positions of the distributor, and the configuration of the device can be simplified.

DETAILED DESCRIPTION

First Embodiment

<General Configuration of First Embodiment>

Figure 1:
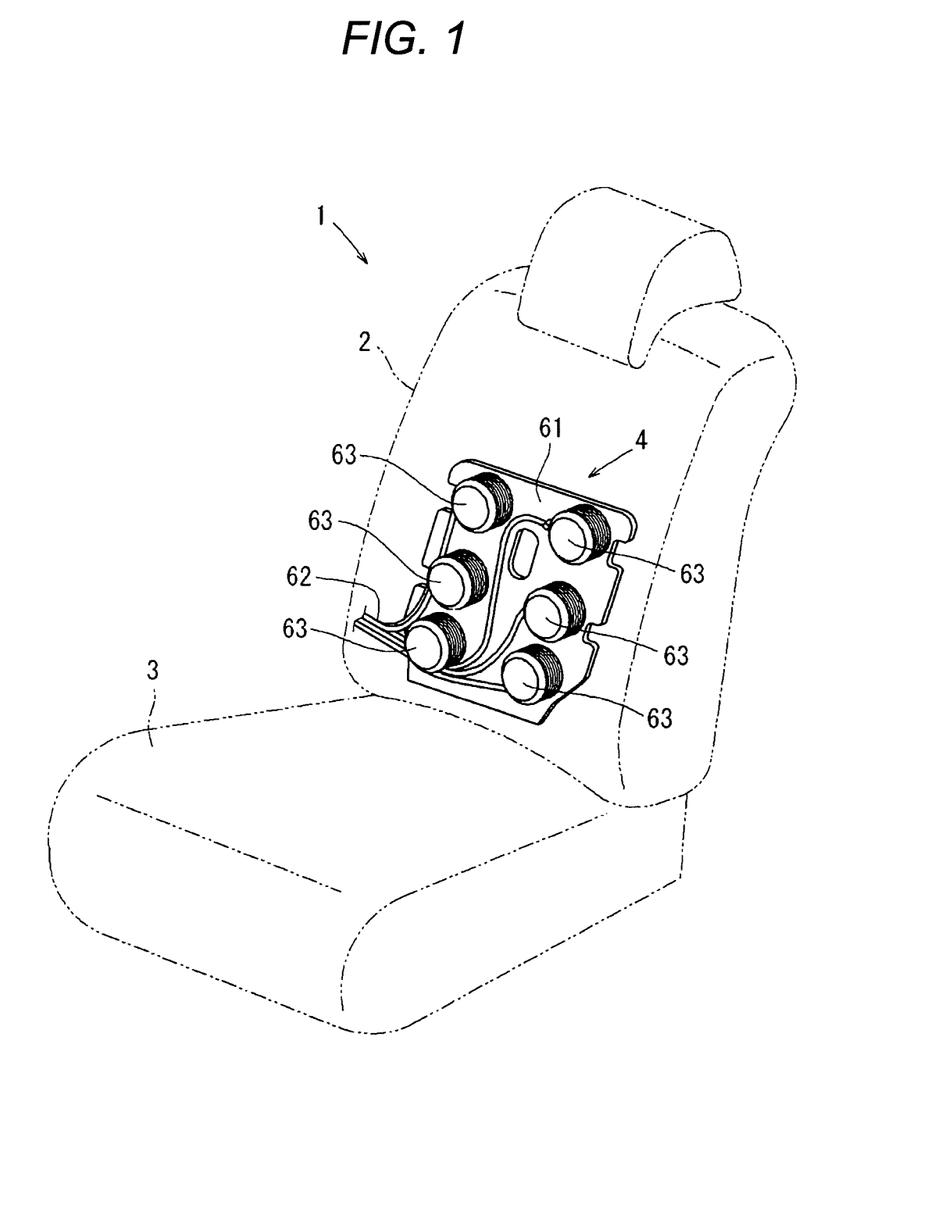
FIG. 1 is an external perspective view of a massage apparatus according to a first embodiment of the disclosure.
Figure 2:
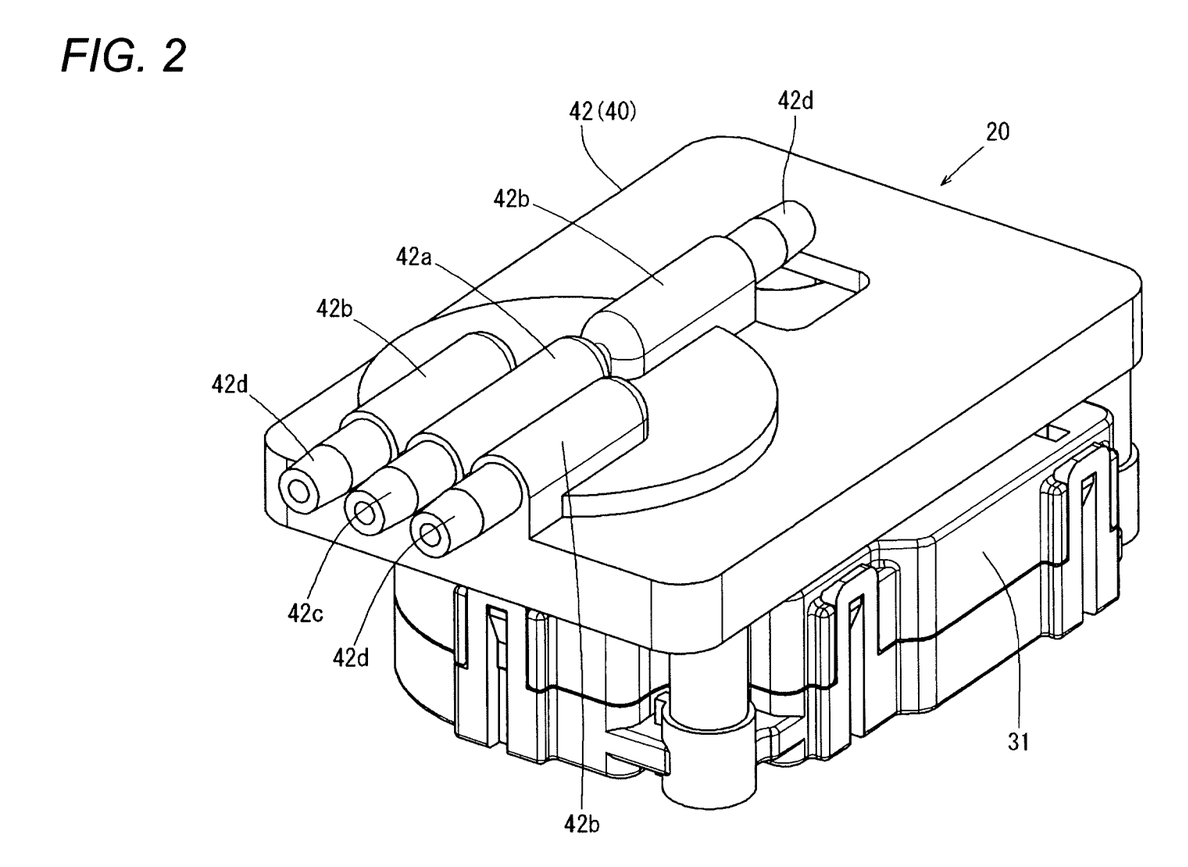
FIG. 2 is an external perspective view of a rotary valve according to the embodiment.

FIG. 1 shows a first embodiment of the disclosure. FIG. 1 shows an automobile seat (corresponding to a seating seat of the disclosure, and hereinafter referred to as "seat") 1 including a massage apparatus 4. The massage apparatus 4 includes an air supply and exhaust device for air cells according to the disclosure.

The seat 1 includes a seat back 2 which serves as a backrest and a seat cushion 3 which serves as a seat portion. A plurality of bladders (corresponding to air cells of the disclosure) 63 are arranged along a seated surface of the seat back 2. Here, six bladders 63 in total are provided on a board 61 fixed in the seat back 2, two in a horizontal direction and three in a vertical direction. Two bladders in the horizontal direction are configured to be supplied with air and exhausted as a pair. For example, air is supplied to and exhausted from the bladders 63 sequentially from a lower side of the seat back 2 to an upper side thereof to massage a body of a person. Hereinafter, the massage apparatus 4 will also be referred to as a three channel massage apparatus, since the massage apparatus 4 includes three pairs of bladders 63. Here, although the massage apparatus 4 is included in the seat back 2 only, the same massage apparatus 4 may also be included in the seat cushion 3.

Figure 7:
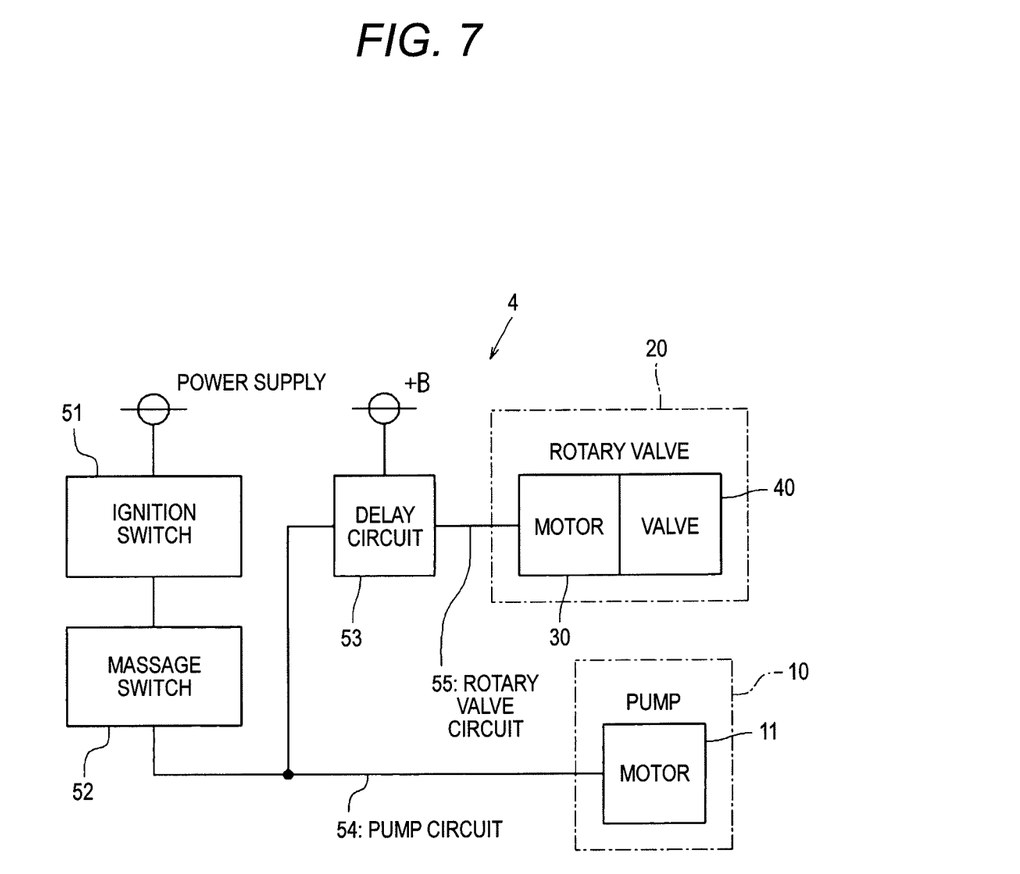
FIG. 7 is a control circuit diagram of the massage apparatus.

FIG. 7 shows a control circuit of the massage apparatus 4. The control circuit includes a pump circuit 54 in which a motor 11 of a pump 10 is connected to a power supply via a first series circuit including a massage switch (corresponding to a drive switch of the disclosure) 52 and an ignition switch (corresponding to a power supply switch of the disclosure) 51 which are connected in series Further, the control circuit includes a valve circuit 55 which includes a series circuit including a motor 30 of a rotary valve (corresponding to a distributor of the disclosure) 20 and a delay circuit 53 which are connected in series and in which the series circuit is connected in parallel with the motor 11 of the pump circuit 54.

The pump 10 is operated to generate air pressure to be supplied to the bladders 63. The rotary valve 20 is operated to rotate a valve 40 to distribute air pressure from the pump 10 to the bladders 63. The rotary valve 20 is connected to each of the bladders 63 via a duct 62 shown in FIG. 1. Therefore, the pump 10 and the rotary valve 20 are operated such that the air pressure generated via the pump 10 is distributed sequentially to the bladders 63 via the rotary valve 20.

The delay circuit 53 supplies power to the motor 30 of the rotary valve 20 without a time delay when both the ignition switch 51 and the massage switch 52 are turned ON from OFF, and cuts off power supply to the motor 30 of the rotary valve 20 by a predetermined time delay when at least one of the ignition switch 51 and the massage switch 52 is turned OFF from ON. The delay circuit 52 is supplied with a constant voltage power supply (+B). The control circuit including the delay circuit 52 may be configured by an analog circuit or by software of a microcomputer. Here, the entire control circuit is configured by an analog circuit, but the motor 30 is a motor whose rotation speed can be controlled.

<Configuration of Rotary Valve 20>

Figure 3:
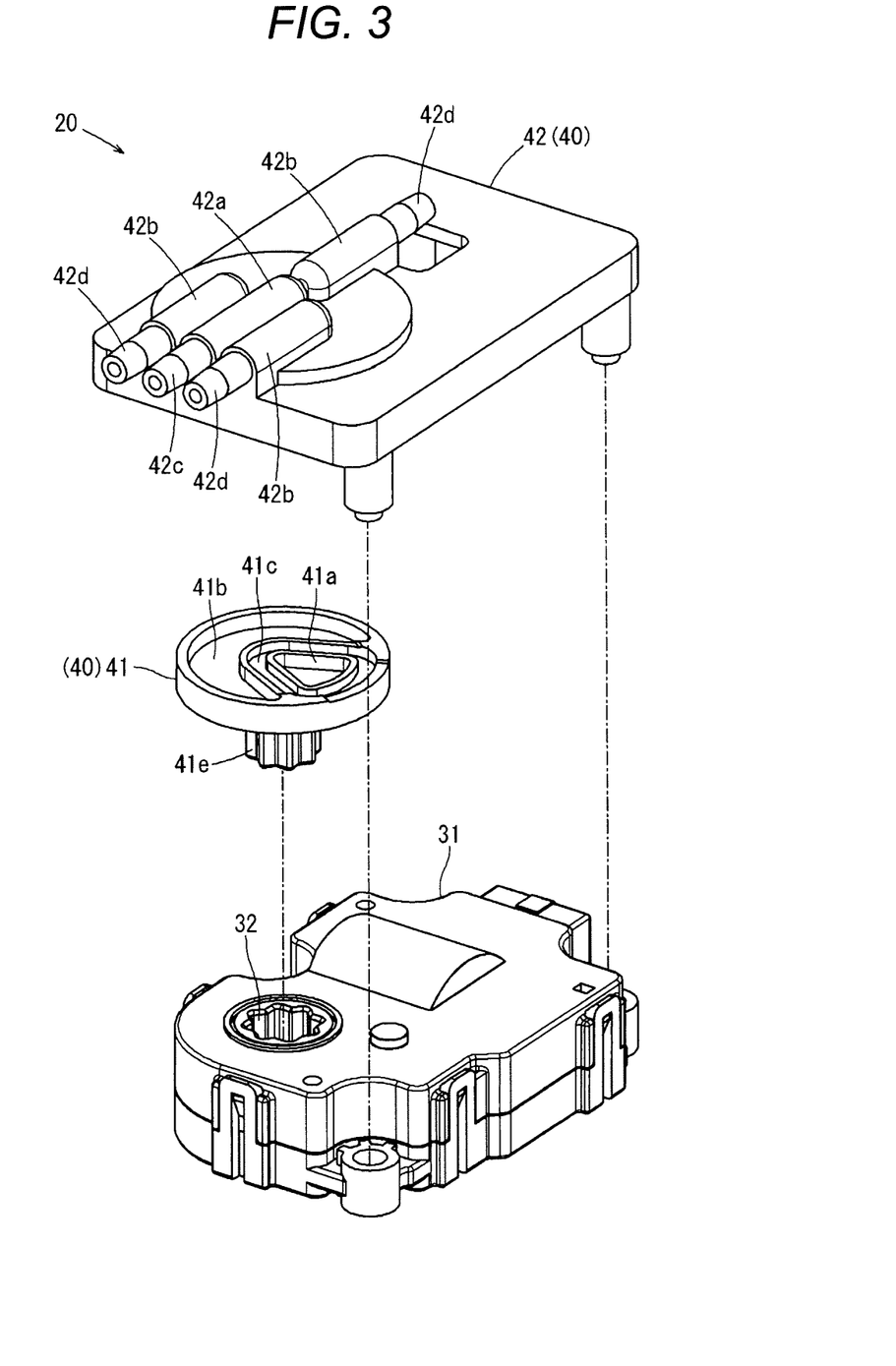
FIG. 3 is an exploded perspective view of the rotary valve.
Figure 4:
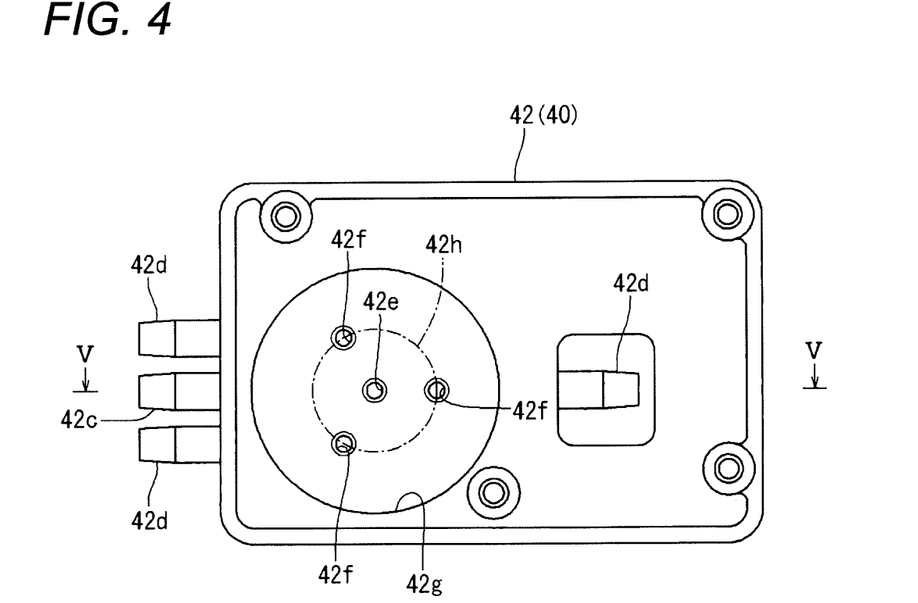
FIG. 4 is a bottom view of a valve housing of the rotary valve.
Figure 5:
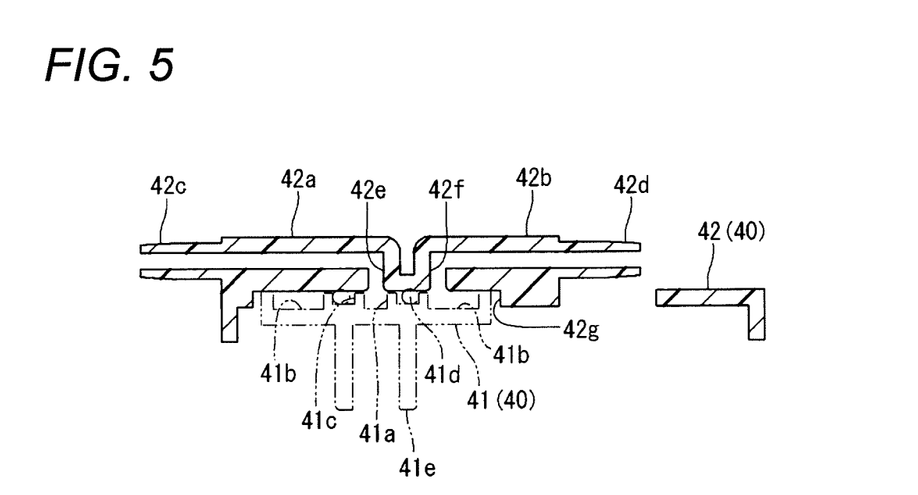
FIG. 5 is a cross-sectional view taken along with a line V-V in FIG. 4.

FIGS. 2 to 6 show the rotary valve 20. As shown in FIG. 3, the rotary valve 20 basically includes three components which are a motor assembly 31, a valve body 41, and a valve housing 42. The motor assembly 31 includes a motor, a reduction drive, and an output shaft 32, which are accommodated in one casing. An internal configuration of the motor assembly 31 is not shown here. The valve body 41 is configured to rotate with a rotation shaft 41e thereof being connected to the output shaft 32 of the motor assembly 31. Further, as shown in FIGS. 4 and 5, the valve housing 42 is configured to receive an upper surface of the valve body 41 in a circular recessed portion 42g formed in a lower surface of the valve housing 42.

An opposite surface of the recessed portion 42g of the valve housing 42 is provided with four integrally molded pipes 42a, 42b. One pipe 42a of the four includes a pump vent passage 42e communicating with a center of the circular recessed portion 42g. The other three pipes 42b include air cell vent passages 42f communicated at equal intervals to an imaginary concentric circle 42h of the recessed portion 42g centering on the pump vent passage 42e. A tip end portion 42c of the pipe 42a communicates with the pump 10. Tip end portions 42d of the pipes 42b communicate with the bladders 63.

Figure 6:
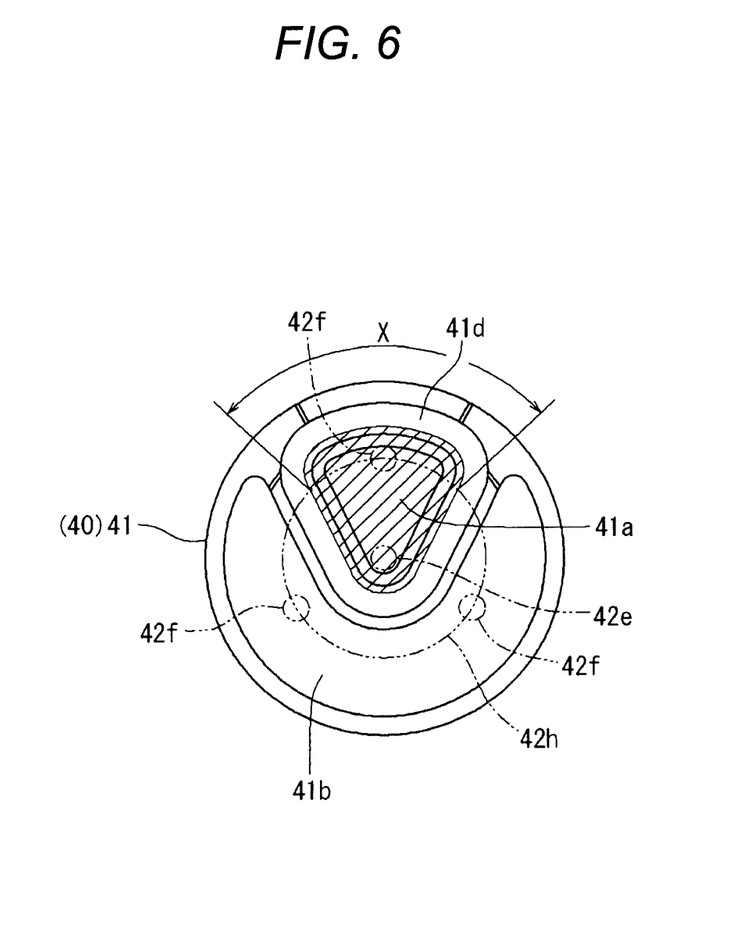
FIG. 6 is a plan view of a valve body of the rotary valve.

An upper surface of the valve body 41 is divided into three regions via vertical walls. A first region is located at a position communicable with the pump vent passage 42e of the pipe 42a and the air cell vent passages 42f of the three pipes 42b to form an air supply chamber 41a in a state where the valve body 41 is received in the recessed portion 42g of the valve housing 42. The air supply chamber 41a is in a state always communicating with the pump vent passage 42e, and also communicates sequentially with the air cell vent passages 42f with rotation of the valve body 41. That is, the air supply chamber 41a has a fan shape expanding from a center of the upper surface of the valve body 41 to an outer circumference side thereof.

A second region is arranged to surround the air supply chamber 41a to form a groove 41c. Further, a third region is a part excluding the air supply chamber 41a and the groove 41c, which forms an air exhaust chamber 41b. In the groove 41c, an O-ring 41d is fitted to seal the air supply chamber 41a and the air exhaust chamber 41b into an airtight state in a state where the valve body 41 is received in the recessed portion 42g of the valve housing 42. In FIG. 6, a region to which hatching is applied is a region which is sealed. An area of the air supply chamber 41a and the air exhaust chamber 41b is configured such that a plurality of air cell vent passages 42f do not communicate with the air supply chamber 41a simultaneously regardless of a rotation position of the valve body 41. In FIG. 6, an expansion angle of the fan, which forms the sealed region, in a rotation angle of the valve body 41 is X°. Here, even in a state where the valve body 41 is received in the recessed portion 42g of the valve housing 42, the air exhaust chamber 41b communicates with the atmosphere via a gap between the air exhaust chamber 41b and the valve housing 42.

<Operation of Embodiment>

Figure 8:
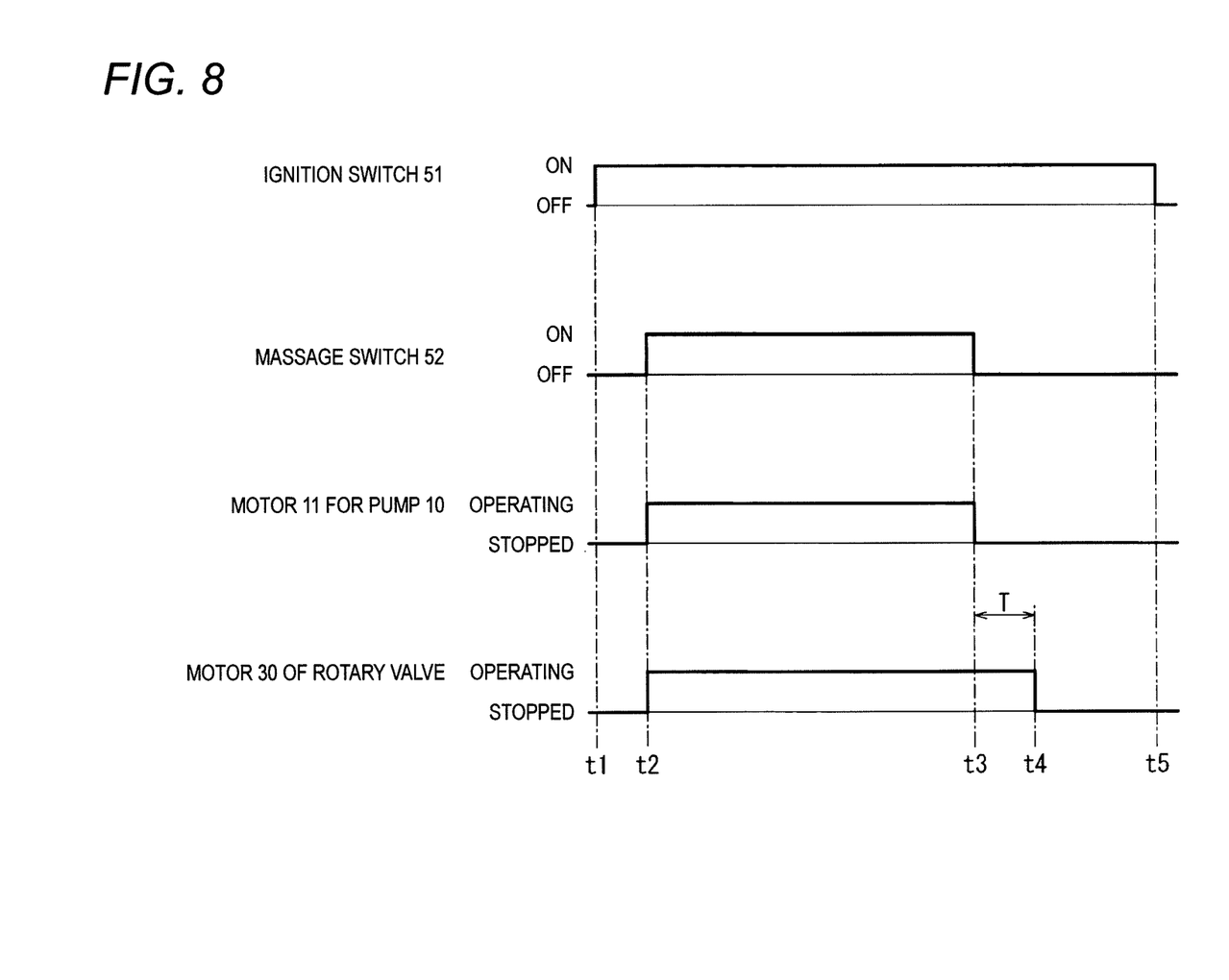
FIG. 8 is a time chart illustrating operation of the control circuit.

As shown in FIG. 8, a motor 11 for the pump 10 operates when the ignition switch 51, which is a power supply switch, is turned ON from OFF at a time point t1 and the massage switch 52 is turned ON from OFF at a time point t2. A motor 30 for the rotary valve 20 also operates via the delay circuit 52. At this time, the delay circuit 52 allows the motor 30 for the rotary valve 20 to be operated immediately without a time delay.

Accordingly, when the pump 10 and the rotary valve 20 are operated, air pressure from the pump 10 is supplied to the air supply chamber 41a via the pipe 42a of the rotary valve 20. The air cell vent passages 42f of the pipes 42b communicate sequentially with the air supply chamber 41a with the rotation of the valve body 41. Air pressure in the air supply chamber 41a is supplied to the air cell vent passage 42f which communicate with the air supply chamber 41a, and to the bladders 63 via the pipes 42b. Meanwhile, when the air cell vent passages 42f of the pipes 42b are communicating with the air exhaust chamber 41b with the rotation of the valve body 41, the bladders 63 communicating with the pipes 42b exhaust air. Therefore, the bladders 63 supply and exhaust air sequentially to perform massaging operation.

As shown in FIG. 8, the motor 11 for the pump 10 stops operating when the massage switch 52 is turned OFF from ON at a time point t3. Meanwhile, the motor 30 for the rotary valve 20 stops operating at a time point t4 which is delayed by a predetermined time T from the time point t3 via function of the delay circuit 52. The predetermined time T is 60X/360Y or above, assuming rotation speed of the rotary valve 20 as Y (rpm) and an angle of the air supply chamber 41a in the rotation angle of the valve body 41 as X)(°. That is, the predetermined time T is no less than a maximum time for the air cell vent passages 42f of the pipes 42b, which are in a state of entering the air supply chamber 41a and receiving air pressure from the pump 10, to achieve a state communicating with the air exhaust chamber 41b.

Therefore, during supplying of air pressure from the pump 10 to one bladder 63 via communicating the air supply chamber 41a, when the massage switch 52 is turned OFF from ON, the supply of air pressure to each bladder 63 is stopped since the pump 10 is stopped immediately. Further, the rotary valve 20 continues to rotate, and a pipe corresponding to the bladder 63 to which air has been supplied is moved from the air supply chamber 41a to the air exhaust chamber 41b. Accordingly, the massage apparatus 4 stops operating in a state where all the bladders 63 are air-exhausted.

Figure 9:
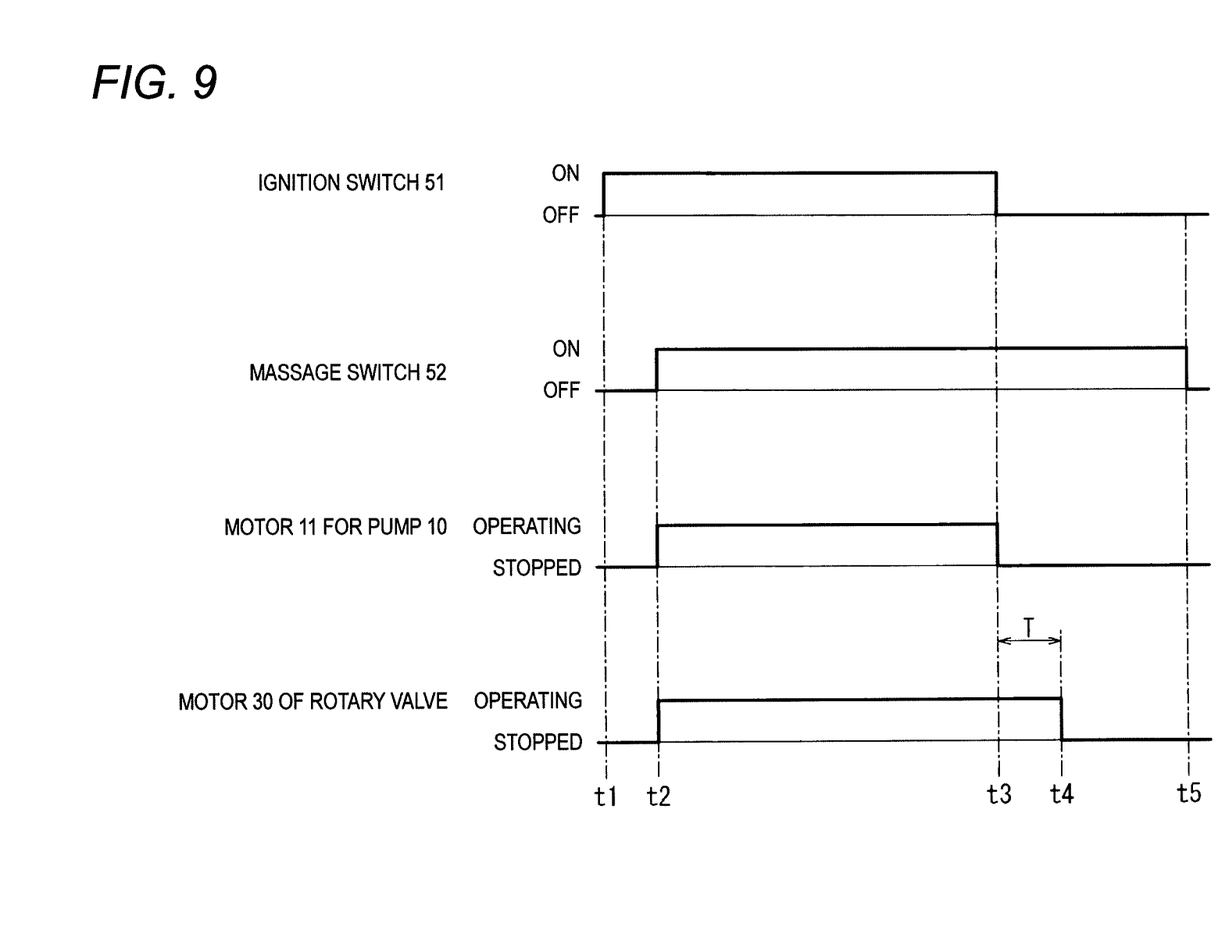
FIG. 9 is time chart similar to FIG. 8 but showing an operating state different from FIG. 8.

As shown in FIG. 8, the ignition switch 51 is turned OFF from ON at a time point t5. Here, as shown in FIG. 9, even in a case where the ignition switch 51 is turned OFF from ON before the massage switch 52 is turned OFF from ON, the motor 11 for the pump 10 stops operating, and the motor 30 for the rotary valve stops operating after the predetermined time T has passed from the turning OFF of the ignition switch 51.

<Effects of First Embodiment>

According to the embodiment, when stopping the massage apparatus 4 from operating, the rotary valve 20 is not stopped immediately so as to put the bladders 63 in an air-exhausted state. When the ignition switch 51 and the massage switch 52 are turned OFF, the rotary valve 20 is controlled to rotate with a time delay by using the delay circuit 52 until a pipe corresponding to the air-supplied bladder 63 reaches a position communicating with the air exhaust chamber 41b. Therefore, it is not necessary to detect a rotation position of the rotary valve 20, and a limit switch for detecting positions can be eliminated. Accordingly, the configuration of the massage apparatus 4 can be simplified.

Second Embodiment

Figure 10:
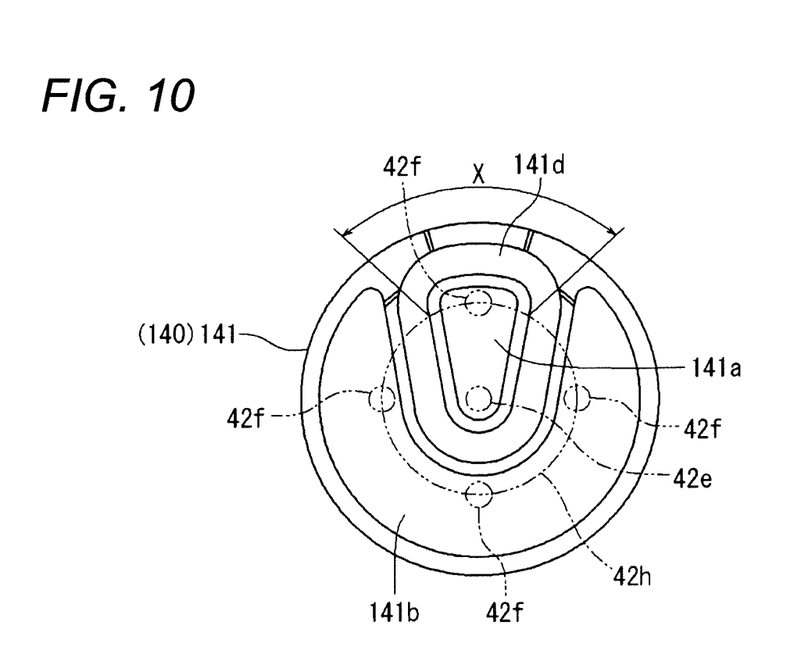
FIG. 10 is a plan view of a valve body of a rotary valve according to a second embodiment of the disclosure.

FIG. 10 shows a valve body 141 of a valve 140 according to a second embodiment. The valve body 141 differs from the valve body 41 if the first embodiment in that the valve body 141 is applied to a four channel massage apparatus which includes four pairs of bladders 63. Therefore, in contrast to the first embodiment in which three air cell vent passages 42f located on the imaginary concentric circle 42h are provided to the valve housing 42, the valve body 141 of the second embodiment includes four air cell vent passages 42e. The other configurations of the second embodiment are the same as those of the first embodiment, and the same elements will be represented by adding 100 to the reference numerals of the first embodiment.

When a predetermined time T of a delay circuit 53 of the second embodiment is the same as the predetermined time T of the first embodiment, since the channel number has increased from three in the first embodiment to four in the second embodiment, the rotation speed Y of a rotary valve 20 of the second embodiment becomes 4/3 times as compared with the rotation speed Y of the rotary valve 20 of the first embodiment, and a rotation angle X of a valve body 41 becomes ¾ times as compared with the rotation angle X of the valve body 41 the first embodiment.

Third Embodiment

Figure 11:
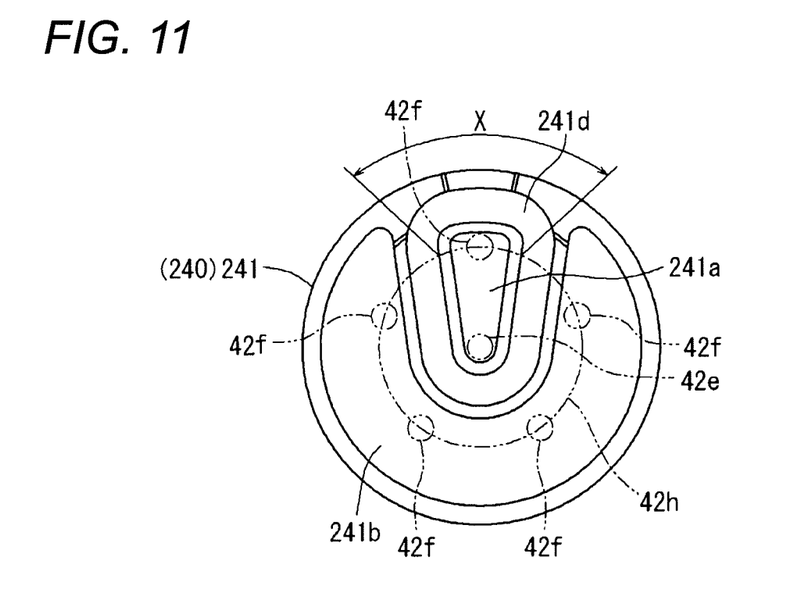
FIG. 11 is a plan view of a valve body of a rotary valve according to a third embodiment of the disclosure.

FIG. 11 shows a valve body 241 of a valve 240 according to a third embodiment. The valve body 241 differs from the valve body 41 if the first embodiment in that the valve body 241 is applied to a five channel massage apparatus which includes five pairs of bladders 63. Therefore, in contrast to the first embodiment in which three air cell vent passages 42f located on the imaginary concentric circle 42h are provided to the valve housing 42, the valve body 241 of the third embodiment includes five air cell vent passages 42e. The other configurations of the third embodiment are the same as those of the first embodiment, and the same elements will be represented by adding 200 to the reference numerals of the first embodiment.

When a predetermined time T of a delay circuit 53 of the third embodiment is the same as the predetermined time T of the first embodiment, since the channel number has increased from three in the first embodiment to five in the third embodiment, the rotation speed Y of a rotary valve 20 of the second embodiment becomes 5/3 times as compared with the rotation speed Y of the rotary valve 20 of the first embodiment, and a rotation angle X of a valve body 41 becomes ⅗ times as compared with the rotation angle X of the valve body 41 the first embodiment.

<Effects of Second and Third Embodiments>

In the second and third embodiments, the time required for rotating the rotary valves 141, 241 of the rotary valve 20 once is increased so as to be proportional to the channel number (number of air cell vent passages 42f). Therefore, even when the predetermined time T of the delay circuit 53 is a constant time, the predetermined time becomes longer than the time for the operating rotary valve 20 to switch from a state of supplying air to one of the bladders 63 to a state of exhausting air from the one of the bladders 63, irrespective of the channel number. In the second and third embodiments, the rotation speed of the motor 30 of the rotary valve 20 can be easily adjusted by a motor whose rotation speed can be controlled, while the predetermined time T of the delay circuit 53 which is an analog circuit cannot be adjusted easily because it is necessary to, for example, adjust the capacitor capacity. Therefore, a timing of switching the operating rotary valve 20 from the state of supplying air to one of the bladders 63 to the state of exhausting air from the one of the bladders 63 after stopping the pump 10 can be easily adjusted depending on the channel number.

Further, in the second and third embodiments, the time required for rotating the rotary valves 141, 241 of the rotary valve 20 once is proportional to the channel number, and thus the rotation speed of the rotary valves 141, 241 is made smaller as the channel number becomes larger. Therefore, as the channel number becomes larger, a rotation angle range of the air supply chamber 141a, 142a of the valve body 141, 241 is made smaller and a rotation angle range of the air exhaust chamber 141b, 142b of the valve body 141, 241 is made larger. Accordingly, since the rotation angle range of the air exhaust chamber 141b, 142b is made larger as the channel number becomes larger, an area of the valve housing 42 which faces the air exhaust chamber 141b, 241b and to which the air cell vent passages 42f are formed is also made larger as the channel number becomes larger. Therefore, the air cell vent passages 42f can be formed easily.

Other Embodiments

Although a specific embodiment has been described above, the disclosure is not limited to those appearances and configurations, and various modifications, additions and deletions can be made thereto. For example, in the above embodiment, although the disclosure is applied to an air supply and exhaust device for bladders of a massage apparatus, it may also be applied to an air supply and exhaust device for air cells, which is used as an actuator for other purposes such as a lumber support of a vehicle seat. Further, in the above embodiment, although the disclosure is applied to an automobile massage apparatus, it may also be applied to any seat exclusively for massaging.

The disclosure provides illustrative, non-limiting examples as follows:

According to a first aspect, there is provided an air supply and exhaust device for air cells, which is configured to supply air to a plurality of air cells and exhaust air from the plurality of air cells, the air supply and exhaust device including: a distributor configured to supply air by supplying air pressure from a pump sequentially to each of the plurality of air cells and exhaust air by supplying atmospheric pressure to the air cell to which air has been supplied; and a control circuit configured to cause the pump and the distributor to operate simultaneously during air supply and exhaust operation to the air cells, and stop the pump from operating and then stop the distributor from operating after a predetermined time has passed from the stop of the operating of the pump when the air supply and exhaust operation to the air cells is stopped, wherein the predetermined time is set to be longer than a time for the distributor which is operating to switch from a state of supplying air to one of the air cells to a state of exhausting air from the one of the air cells.

According to the first aspect, the distributor continues operating for a time until the distributor reaches a position where the atmospheric pressure is supplied air cells when air supply and exhaust operation to the air cells is stopped. Accordingly, the air supply and exhaust operation to the air cells is stopped after the air cells reach a position communicating with the atmospheric pressure. Therefore, a function of keeping the distributor operating until the air cells reach the position communicating with the atmospheric pressure can be realized without a limit switch for detecting positions of the distributor, and the configuration of the device can be simplified.

According to a second aspect, there is provided the air supply and exhaust device according to first aspect, wherein the pump is configured to be operated by a first motor, wherein the distributor includes a rotary valve configured to be operated by a second motor, wherein the control circuit includes: a pump circuit in which the first motor is connected to a power supply via a first series circuit including a drive switch configured to drive the pump and a power supply switch which are connected in series; and a valve circuit which includes a second series circuit including the second motor and a delay circuit which are connected in series and in which the second series circuit is connected in parallel with the first motor of the pump circuit, and wherein the delay circuit is configured to output an output current without delay when starting supplying of an input current, and is configured to stop outputting the output current with a delay by a predetermined time when stopping the supplying of the input current.

According to the second aspect, when both the power supply switch and the drive switch configured to drive the pump are turned on, the pump and the rotary valve are operated simultaneously to supply the air pressure generated by the pump to each air cell via the rotary valve. On the other hand, when at least one of the power supply switch and the drive switch configured to drive the pump is turned off, the pump is stopped immediately, and the rotary valve is continues to be operated for the predetermined time of delay by the delay circuit. Therefore, the rotary valve is operated until all of the air cells are supplied with atmospheric pressure, and is then stopped. Accordingly, regardless of the timing at which at least one of the power supply switch and the drive switch configured to drive the pump is turned off, a function of keeping the distributor operating until each air cell is exhausted can be realized without a limit switch for detecting positions of the distributor, and the configuration of the device can be simplified.

According to a third aspect, there is provided the air supply and exhaust device according to the second aspect, wherein the rotary valve includes: a valve housing having a plurality of air cell vent passages to which the air pressure is supplied from the pump, the number of the plurality of air cell vent passages corresponding to the number of the plurality of air cells; and a valve body configured to be rotationally driven by the second motor so as to rotate relative to the valve housing and configured to supply the air pressure from the pump sequentially to each of the plurality of air cells such that, during one rotation of the valve body, the air pressure is supplied to each air cell once, wherein the second motor is configured such that a rotation speed thereof is capable of being changed such that a time required for rotating the valve body once is proportional to the number of the plurality of air cell vent passages, and wherein the predetermined time of delay of the delay circuit is constant irrespective of the number of air cell vent passages.

According to the third aspect, the time required for rotating the valve once is proportional to the number of the plurality of air cell vent passages. Therefore, even when the predetermined time of the delay circuit is a constant time, the predetermined time becomes longer than the time for the operating rotary valve to switch from a state of supplying air to one of the air cells to a state of exhausting air from the one of the air cells, irrespective of the number of the sir cell vent passages. Accordingly, in a case where the rotation speed of the second motor can be easily adjusted but the predetermined time of the delay circuit cannot be easily adjusted compared thereto, a timing of switching the rotary valve from the state of supplying air to one of the air cells to the state of exhausting air from the one of the air cells after stopping the pump can be easily adjusted depending on the number of the air cell vent passages.

According to a fourth aspect, there is provided the air supply and exhaust device according to the third aspect, wherein each of the plurality of vent passages communicates with the plurality of air cells, respectively, wherein the plurality of air cell vent passages are arranged along a circumference of a virtual circle with equal intervals and a pump vent passage communicating with the pump is arranged on the center of the virtual circle, wherein the valve body faces each of the plurality of air cell vent passages and the pump vent passage of the valve housing and is configured to rotate around the pump vent passage, wherein the valve body includes: an air supply chamber which always communicates with the pump vent passage and also communicates with one of the plurality of the air cell vent passages none or does not communicate with any of the plurality of the air cell vent passages depending on a rotation angle of the valve body; and an air exhaust chamber which communicates with atmosphere and also communicates with all of the plurality of air cell vent passages except for the one air cell vent passage that communicates with the air supply chamber depending on the rotation angle of the valve body, and wherein a rotation angle range of the air supply chamber among an entire rotation angle range of the valve body becomes smaller as the number of the plurality of air cell vent passages becomes larger.

According to the fourth aspect, the time required for rotating the valve body once is proportional to the number of the plurality of air cell vent passages, and thus the rotation speed of the valve body is made smaller as the number of air cell vent passages becomes larger. Therefore, as the number of the air cell vent passages becomes larger, a rotation angle range of the air supply chamber of the valve body is made smaller and a rotation angle range of the air exhaust chamber of the valve body is made larger. Accordingly, since the rotation angle range of the air exhaust chamber is made larger as the number of the air cell vent passages becomes larger, an area of the valve housing which faces the air exhaust chamber and to which the air cell vent passages are formed is also made larger as the number of the air cell vent passages becomes larger. Therefore, the air cell vent passages can be formed easily.

According to a fifth aspect, there is provided the air supply and exhaust device according to any one of the first to fourth aspects, wherein the plurality of air cells are provided in a seating seat and are configured to massage a seated person by being supplied with air and exhausted sequentially; wherein the distributor is a rotary valve configured to supply air to the plurality of air cells and exhaust air from the plurality of air cells sequentially; and wherein the predetermined time is set to be longer than a time during which air is supplied to one of the plurality of air cells via the rotary valve which is operating.

According to the fifth aspect, in a massage apparatus using a rotary valve, when the massage apparatus is stopped, the rotary valve is stopped from operating after the rotary valve reaches a state where the rotary valve does not supply air to the air cells but exhausts air therefrom. Therefore, a function of keeping the rotary valve operating until air is exhausted from the air cells can be realized without a limit switch for detecting positions, and the configuration of the device can be simplified.

What is claimed is:

1. An air supply and exhaust device for air cells, which is configured to supply air to a plurality of air cells and exhaust air from the plurality of air cells, the air supply and exhaust device comprising:
   a distributor configured to supply air by supplying air pressure from a pump connected to a power supply sequentially to each of the plurality of air cells and exhaust air by supplying atmospheric pressure to the air cell to which air has been supplied; and
   a control circuit configured:
      to cause the pump and the distributor to operate simultaneously during air supply and exhaust operation to the air cells, and
      to cut the power supply to the pump so as to stop the pump from operating and then stop the distributor from operating after a predetermined time has passed from the stop of the operating of the pump when the air supply and exhaust operation to the air cells is stopped,
   wherein the predetermined time for stopping the distributor after stopping operation of the pump is set to be longer than a time for one of the air cells to switch from an air-supply state to an air-exhaust state.

2. The air supply and exhaust device according to claim 1,
   wherein the pump is configured to be operated by a first motor,
   wherein the distributor includes a rotary valve configured to be operated by a second motor,
   wherein the control circuit includes:
      a pump circuit in which the first motor is connected to the power supply via a first series circuit including a drive switch configured to drive the pump and a power supply switch which are connected in series; and
      a valve circuit which includes a second series circuit including the second motor and a delay circuit which are connected in series and in which the second series circuit is connected in parallel with the first motor of the pump circuit, and
   wherein the delay circuit is configured to output an output current without delay when starting supplying of an input current, and is configured to stop outputting the output current with a delay by a predetermined time when stopping the supplying of the input current.

3. The air supply and exhaust device according to claim 2,
   wherein the rotary valve includes:
      a valve housing having a plurality of air cell vent passages to which the air pressure is supplied from the pump, the number of the plurality of air cell vent passages corresponding to the number of the plurality of air cells; and
      a valve body configured to be rotationally driven by the second motor so as to rotate relative to the valve housing and configured to supply the air pressure from the pump sequentially to each of the plurality of air cells such that, during one rotation of the valve body, the air pressure is supplied to each air cell once,
   wherein the second motor is configured such that a rotation speed thereof is capable of being changed such that a time required for rotating the valve body once is proportional to the number of the plurality of air cell vent passages, and
   wherein the predetermined time of delay of the delay circuit is constant irrespective of the number of air cell vent passages.

4. The air supply and exhaust device according to claim 3,
   wherein each of the plurality of vent passages communicates with the plurality of air cells, respectively,
   wherein the plurality of air cell vent passages are arranged along a circumference of a virtual circle with equal intervals and a pump vent passage communicating with the pump is arranged on the center of the virtual circle,
   wherein the valve body faces each of the plurality of air cell vent passages and the pump vent passage of the valve housing and is configured to rotate around the pump vent passage,
   wherein the valve body includes:
      an air supply chamber which always communicates with the pump vent passage and also either communicates with one of the plurality of the air cell vent passages or does not communicate with any of the plurality of the air cell vent passages depending on a rotation angle of the valve body; and
      an air exhaust chamber which communicates with atmosphere and also communicates with all of the plurality of air cell vent passages except for the one air cell vent passage that communicates with the air supply chamber depending on the rotation angle of the valve body, and
   wherein a rotation angle range of the air supply chamber among an entire rotation angle range of the valve body becomes smaller as the number of the plurality of air cell vent passages becomes larger.

5. The air supply and exhaust device according to claim 1,
   wherein the plurality of air cells are provided in a seating seat and are configured to massage a seated person by being supplied with air and exhausted sequentially;
   wherein the distributor is a rotary valve configured to supply air to the plurality of air cells and exhaust air from the plurality of air cells sequentially; and wherein the predetermined time is set to be longer than a time during which air is supplied to one of the plurality of air cells via the rotary valve which is operating.

\* \* \* \* \*